United States Patent [19]
Peterson et al.

[11] Patent Number: 5,767,856
[45] Date of Patent: Jun. 16, 1998

[54] PIXEL ENGINE PIPELINE FOR A 3D GRAPHICS ACCELERATOR

[75] Inventors: James R. Peterson, Portland, Oreg.; Glenn C. Poole, Fremont, Calif.; Walter E. Donovan, Milpitas, Calif.; Paul A. Shupak, San Jose, Calif.

[73] Assignee: Rendition, Inc., Sunnyvale, Calif.

[21] Appl. No.: 616,679

[22] Filed: Mar. 15, 1996

Related U.S. Application Data

[60] Provisional application No. 60/002,625 Aug. 22, 1995.

[51] Int. Cl.$^6$ .................................................. G06F 12/00
[52] U.S. Cl. .................................................. 345/422; 345/503
[58] Field of Search .......................... 395/122, 509, 395/510, 511, 515, 503; 345/186, 187, 188, 422, 501–503, 506, 509, 511, 521, 196

[56] References Cited

U.S. PATENT DOCUMENTS

| | | | |
|---|---|---|---|
| 4,831,581 | 5/1989 | Rubinfeld | 395/250 |
| 5,001,469 | 3/1991 | Pappas et al. | 340/172 |
| 5,023,776 | 6/1991 | Gregor | 395/449 |
| 5,043,921 | 8/1991 | Gonzalez-Lopez et al. | 345/422 |
| 5,056,044 | 10/1991 | Frederickson et al. | 395/516 |
| 5,268,995 | 12/1993 | Diefendorff et al. | 395/122 |
| 5,367,632 | 11/1994 | Bowen et al. | 345/518 |
| 5,423,016 | 6/1995 | Tsuchiya et al. | 395/450 |
| 5,430,888 | 7/1995 | Witek et al. | 395/800 |
| 5,528,738 | 6/1996 | Sfarti et al. | 345/443 |
| 5,543,824 | 8/1996 | Priem et al. | 345/201 |
| 5,544,306 | 8/1996 | Deering et al. | 345/507 |
| 5,594,854 | 1/1997 | Baldwin et al. | 345/441 |
| 5,621,866 | 4/1997 | Murata et al. | 395/122 |

OTHER PUBLICATIONS

Haeberli and Akeley, "The Accumulation Buffer: Hardware Suport forHigh Quality Rendering", *ACM Computer Graphics*, vol. 24, No. 4, Aug. 1990, pp. 309–318.

*Primary Examiner*—Rudolph J. Buchel, Jr.
*Attorney, Agent, or Firm*—Blakely, Sokoloff, Taylor & Zafman, LLP

[57] ABSTRACT

A pixel engine pipeline (including a "front-end" and a "back-end") communicates pixel information between a graphics processor, a pixel engine, a data cache, and system memory. The "front-end" (for reading requested data) includes a command queue for receiving graphics instructions from a graphics processor. Read requests in the command queue are stored in a read request queue. Extraction instructions corresponding to at least a portion of the read request are stored in an attribute queue. Control logic determines whether the requested data is located in a data cache. The read request is stored in a load request queue and the requested data is retrieved from system memory into a load data queue, if the requested data is not in the data cache. The control logic stores the requested data into a read data queue. The requested data is provided to a stage of the pixel engine from the read data queue in accordance with the extraction instructions. A "back-end" (for writing graphics information to system memory) of the pixel engine pipeline includes a write data queue receiving write data from the pixel engine, wherein the write data includes pixel information interleaved with Z information. A first accumulation buffer is used to accumulate pixel information. A second accumulation buffer is used to accumulate Z information. A multiplexer selects a selected buffer from one of the first and second accumulation buffers. The selected buffer is written to a store buffer for subsequent writing to system memory.

13 Claims, 3 Drawing Sheets

PIXEL ENGINE PIPELINE FOR A 3D GRAPHICS ACCELERATOR

CROSS-REFERENCE TO RELATED APPLICATION

This application claims the benefit of U.S. Provisional application Ser. No. 60/002,625, filed Aug. 22, 1995.

FIELD OF THE INVENTION

This invention pertains to the field of computer graphics. In particular this invention pertains to methods and apparatus for accelerated graphics processing in a computer system.

BACKGROUND OF THE INVENTION

Computer systems typically include a processor, an input device such as a keyboard or a pointing device, a mass storage device, working memory such as random access memory (RAM), and an output device such as a display. A computer system typically includes subsystems which support these devices. Available processor capacity, available mass storage, and free memory are often referred to as system resources.

System performance is often decreased by "bottlenecks" at one or more individual system components. For example, a processor bottleneck indicates that the processor is the limiting system component. Similarly, a memory bottleneck might indicate that the memory cannot be accessed quickly enough or that the system must perform an inordinate amount of memory paging due to insufficient memory resources. Furthermore, applications tend to have differing system resource requirements. A spreadsheet application might require greater processor utilization than a word processing application. If the processor utilization requirements are too great, the processor will become the system bottleneck.

Subsystems have been developed to help offload resource requirements from other system components. For example, math coprocessors have been developed to help offload some of the resource requirements made on the processor. A math coprocessor handles numerical calculations so that the processor can attend to other system requests. Thus the math coprocessor increases computational speed and helps to reduce performance sensitivity to applications that require greater computational resources.

A graphics accelerator is a specialized graphics rendering subsystem for a computer system. An application program executing on the processor generates geometry input data that defines graphics elements for display on the display device. The application program typically transfers the geometry information from the processor to the graphics accelerator. The graphics accelerator, as opposed to the processor, then has the task of rendering the corresponding graphics elements on the display device. This helps to free up the processor to handle other system requests.

Typically objects to be displayed are modeled as polygons. In particular, the triangle is a polygon that is commonly used in rendering three dimensional objects on the display screen. Setup calculations are performed to define the triangles. Then the triangles may be modified by adding shading, texturing, hazing, or other features before being displayed.

Generally, the attributes or features of each pixel of the display can be adjusted. At some point, each pixel of a triangle will have to have these features determined so that the triangle can be properly rendered on the display. The ability to control each pixel individually during the rendering process gives greater control over the appearance and "realism" of the displayed image.

One prior art technique for rendering the triangles was to use the host processor to setup the triangles. Applications using this prior art technique tend to be processor bound from a performance viewpoint. In other words, the processor becomes a primary bottleneck in the system. Improving system performance requires a faster, more capable host processor.

Another prior art technique used hardwired logic to accomplish the setup calculations for a triangle or sometimes a single span of a triangle. This prior art technique is inflexible and is sensitive to changes in application programming interfaces, data formats, and rendering algorithm technologies.

Other prior art 3D graphics accelerators required separate banks of memory for textures and other graphic primitives. A disadvantage of these prior art 3D graphics controllers is that the additional bank(s) of memory tend to substantially increase the cost of the graphics accelerator.

What is needed is a relatively inexpensive flexible architecture for a three dimensional graphics accelerator that permits control over individual pixels of the display using a single bank of memory.

SUMMARY OF THE INVENTION

A method and apparatus for communicating information in an integrated graphics accelerator is described. A pixel engine pipeline (including a "front-end" and a "back-end") communicates pixel information between a graphics processor, a pixel engine, a data cache, and system memory in the graphics accelerator.

The "front-end" or input side of the pixel engine pipeline includes a command queue. The command queue is coupled to provide graphics instructions from a graphics processor to a first stage of a pixel engine, the instructions including a read request for requested data. An attribute queue is coupled to the command queue and a subsequent stage of the pixel engine. The attribute queue stores an extraction instruction corresponding to at least a portion of the read request. A read request queue is coupled to receive the read request from the command queue. Control logic stores a load request in a load request data queue if the requested data is not located in a data cache. The control logic also generates data source instructions indicating a location of the requested data. If the requested data is not in the data cache, then the requested data is fetched from system memory into a load data queue in accordance with the load request. The control logic stores the requested data in a read data queue from one of the load data queue and the data cache in accordance with the data source instructions. The subsequent stage then extracts the requested data from the read data queue in accordance with the extraction instruction. An output side or "back-end" of the pixel engine pipeline includes a write data queue. The write data queue receives write data from a pixel engine, wherein the write data includes pixel information interleaved with Z information. A first accumulation buffer is used to accumulate pixel information from the write data queue. A second accumulation buffer is used to accumulate Z information from the write data queue. A multiplexer selects a selected buffer for writing to system memory from one of the first and second accumulation buffers. The selected buffer is then written to a store buffer for subsequent writing to the system memory.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
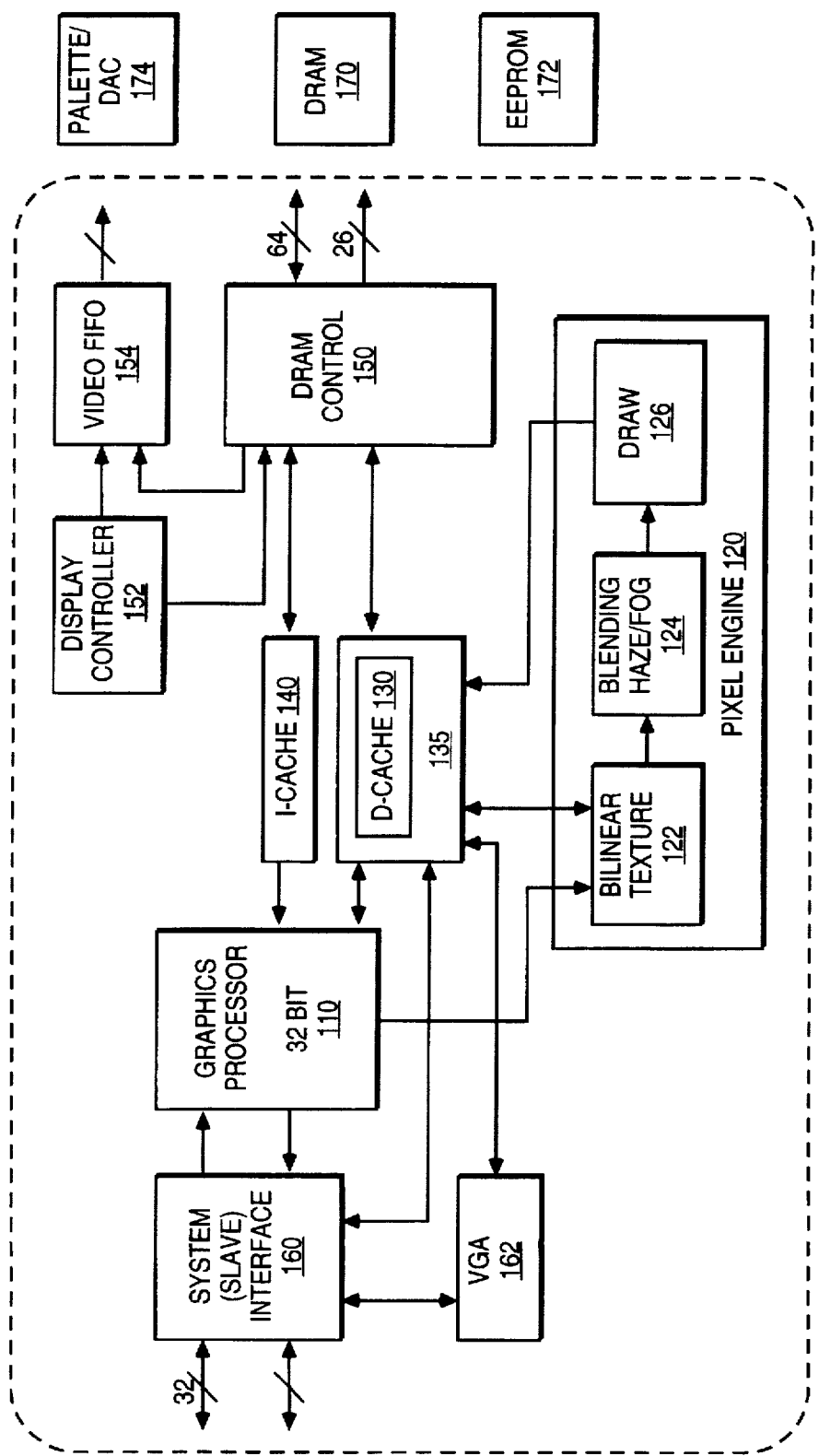
FIG. 1 illustrates a block diagram of the integrated architecture for the graphics accelerator.

FIG. 1 illustrates a block diagram for data flow through the 3D graphics accelerator.

Graphics processor 110 utilizes separate data and instruction caches to facilitate processor throughput. In one embodiment, graphics processor 110 is a reduced instruction set (RISC) processor. The instruction cache (I-Cache 140) retrieves processor instructions from system memory 170 through memory controller 150. In one embodiment, system memory 170 is dynamic random access memory (DRAM) and memory controller 150 is a DRAM controller. Data block 135 is used for communicating data between system memory 170 and graphics processor 110. Data block 135 include data cache (D-cache) 130.

Graphics processor 110 is a programmable processor. The graphics processor may be accessed from an external system bus using system slave or bus-master interface 160. In one embodiment, the system bus is a peripheral component interface (PCI) bus and the system slave interface 160 is a PCI-bus compatible interface.

Pixel engine 120 is used for complex pixel processing. The pixel engine is a pipelined pixel engine and thus can be further divided into two or more functional units or stages. In one embodiment, pixel engine 120 can be divided into three functional units. These functional units include bilinear texture unit 122, blending and haze/fog unit 124, and draw unit 126.

Figure 2:
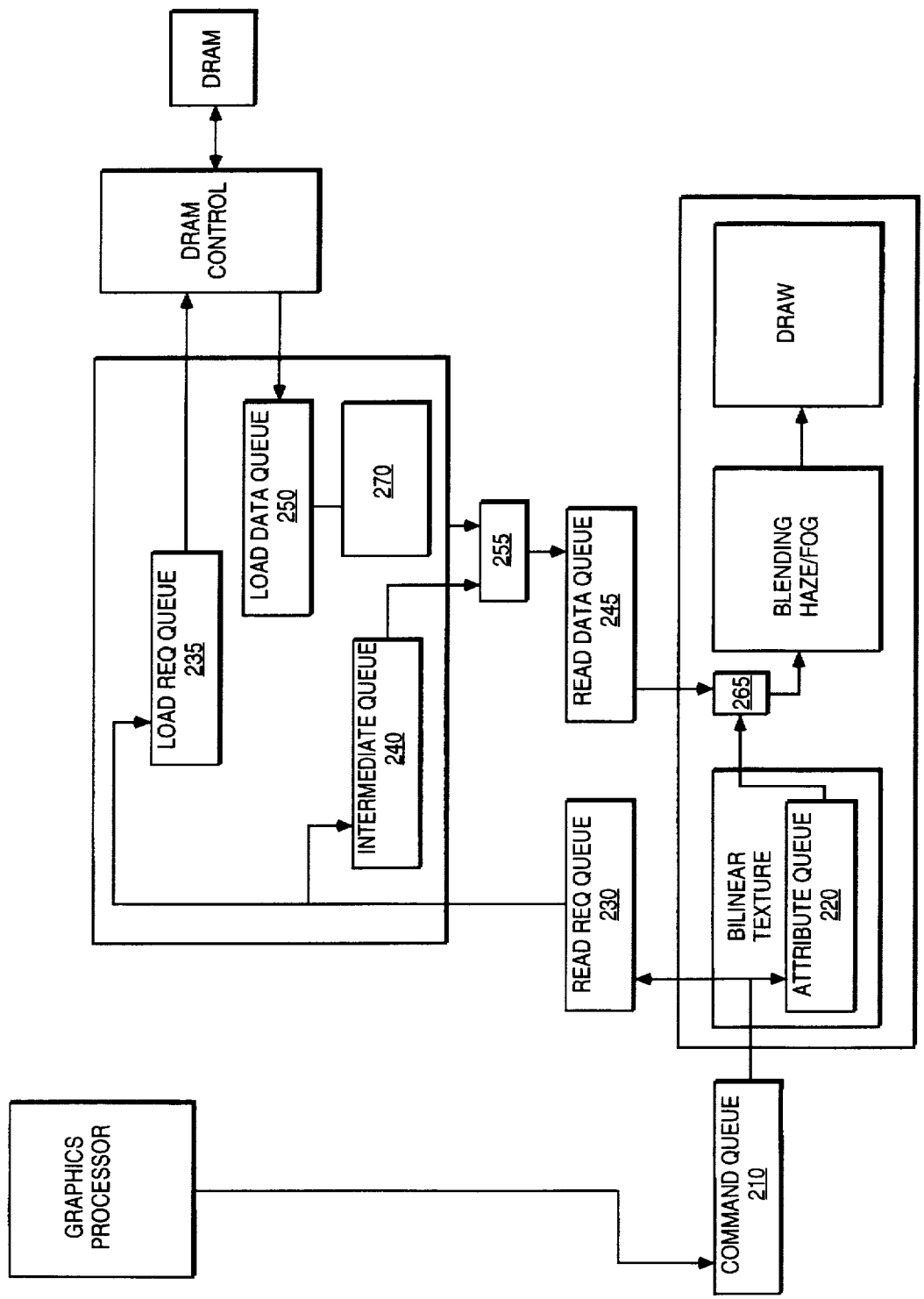
FIG. 2 shows data flow through queues that form portions of the pixel pipeline for inputting instructions and data into the pixel engine.

Data block 135 including D-cache 130 is shared between system slave interface 160, graphics processor 110, and pixel engine 120. A pixel engine pipeline communicates instructions and data between the D-cache, the pixel engine, and the DRAM system memory. The pixel engine pipeline includes a series of first-in-first-out queues located among these components. FIG. 2 illustrates the location and function of a number of the queues in the "front-end" or input side of the pixel engine pipeline. Command queue 210 serves as an instruction and data buffer between the graphics processor and the pixel engine. The graphics processor sends information containing pixel commands, direct data from the graphics processor, and read requests to the pixel engine by putting the information into command queue 210.

The pixel engine pipeline is an in-order pipeline. In other words, instructions from the processor are acted upon in the order that they are issued. From the command queue, commands and direct data are sent to attribute queue 220. These commands include instructions as to how many bytes should be retrieved from the read data queue 245. Read requests are sent to read request queue 230 for subsequent use by D-cache 130. The read request is in the form of an address and a number of bytes to read. Example of data that might need to be read includes Z, texel, and pixel information. Control logic 255 within the data block determines whether or not the data has to actually be retrieved from the system memory 170.

The D-cache includes line buffers 270. The line buffers receive the data from system memory 170. In one embodiment, there are four eight byte line buffers. Typically the same data line might be used several times before another data line is selected. The graphics operations tend to be highly localized. For example, the same operation is often performed on groups of adjacent pixels. For this reason, control logic 255 determines whether the line buffers contain the information sought in the read request.

If control logic 255 determines that the line buffers 270 do not contain the information sought in the read request, then a load request is forwarded to load request queue 235. If a load request is made, the data retrieved from system memory 170 is placed in load data queue 250.

Independent of the need for load(s), data source instructions as to how to control the line buffers are placed in intermediate queue 240. These data source instructions may be generated by control logic 255. The instructions indicate how many data lines should be retrieved or "popped" from the load data queue and into what line buffer(s) those data lines should be placed if data is being retrieved. The requested data in load data queue 250 is always retrieved into one of the line buffers. The instructions also indicate which line buffer(s) and which bytes are to be read regardless of whether data was retrieved from the load data queue. The data source instructions are used by control logic 255 to place line buffer data into read data queue 245. In other words, the data source instructions will inform control logic 245 which bytes to read from one or more line buffers whether or not a load request was performed.

In one embodiment, a "bypass" operation is provided so that control logic 255 can retrieve the requested data directly from load data queue 250 into read data queue 245. The requested data is simultaneously or subsequently written to the line buffers. In other words, the control logic can essentially select from either the load data queue or the line buffers. If the load data queue is accessed, the requested data is made available to the read data queue before or simultaneously with the step of storing the requested data in the line buffer(s). This helps to improve performance by moving the step of storing the requested data in the read data queue 245 so that it is before or simultaneous to the step of storing the requested data in the line buffers. Thus read data queue 245 does not need to wait for the requested data to be placed into line buffer(s) 270 first.

One embodiment of a data caching mechanism including circuitry for determining the location of the requested data and generating the data source instructions may be found in copending U.S. patent application Ser. No. 08/616,540, entitled "Pixel Engine Data Caching Mechanism" of Krishnamurthy, et al., filed Mar. 15, 1996.

The information in the attribute queue is extracted in a first-in-first-out basis to continue down the pixel pipeline for processing by the functional units of the pixel engine. As discussed above, at the time read requests were made, instructions were placed in the attribute queue as to how to extract data from read data queue 245. As these instructions are encountered when processing the contents of the attribute queue, control logic 265 extracts information from the read data queue to send down the pixel pipeline in accordance with the instructions. In other words, the instructions will indicate how many bytes to extract (or "pop") from the read data queue into the pixel pipeline.

Figure 3:
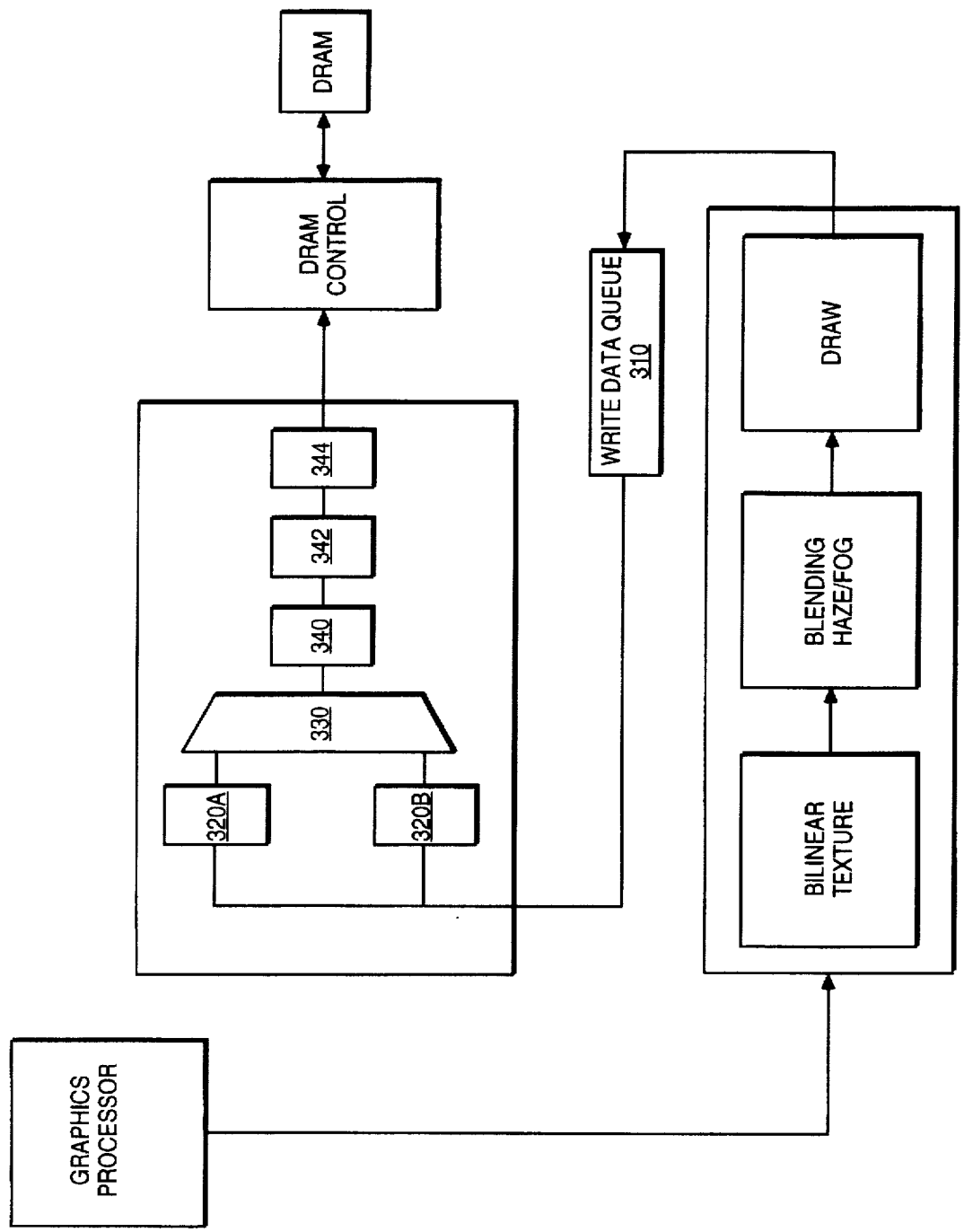
FIG. 3 illustrates data flow through the queues that are associated with the output of the pixel engine.

A data flow diagram for the output end of the pixel engine pipeline is illustrated in FIG. 3. The output of the pixel engine will eventually be sent to system memory or the video buffers (154 in FIG. 1).

The output of the pixel engine is sent to write data queue 310. The write data queue serves as a buffer for the dual associative store accumulation buffers 320a and 320b. Register 320a and 320b are two-way set associative buffers, so each can merge writes (i.e., accumulate) to the same data line into a single memory write. The use of two buffers permits Z-buffering and pixel draw operations using a single pipeline. The Z-data and the pixel information (such as color) are interleaved. Similarly, the respective address information is also interleaved. In other words, the Z-address corresponding to the Z-data is interleaved with the pixel address associated with the pixel information such that Z address and pixel addresses are likewise interleaved. Without two accumulation buffers, the Z address and pixel address information would conflict every cycle. The use of two way set associative accumulation buffers permits proper accumulation as they are interleaved with pixels in the pixel pipeline.

The use of the two accumulation buffers permits several accumulations before a single system memory write is performed. Because Z information is interleaved with pixel information, a system memory write would otherwise need to be performed for each piece of data. For example, if the data from the pixel pipeline includes Z1, pixel1, Z2, pixel2, then the write sequence becomes Z1 write, pixel1 write, Z2 write, pixel2 write. This tends to decrease system performance. The use of two accumulation buffers however permits several Zs and pixels to be accumulated (concatenated for storage) before an actual memory write is performed. This write system takes advantage of the highly localized nature of much of the graphics processing. Typically, although interleaved with Z information, the pixels from the output of the pixel engine are clustered into groups of adjacent pixels and will share addresses close to each other in memory. The buffers are dumped when necessary to store queues 340, 342, and 344 which hold the information for writing to system memory. Multiplexer 330 selects which accumulation buffer to empty into the store buffers based on a "least recently used" algorithm.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A pixel engine pipeline comprising:
    a write data queue receiving write data from a pixel engine, wherein the write data includes pixel information interleaved with Z information;
    a first accumulation buffer, wherein pixel information from the write data queue is accumulated in the first accumulation buffer;
    a second accumulation buffer, wherein Z information from the write data queue is accumulated in the second accumulation buffer;
    a multiplexer for selecting a selected buffer from one of the first and second accumulation buffers; and
    a store buffer, wherein the selected buffer is written to the store buffer.

2. The pixel engine pipeline of claim 1 wherein the first and second accumulation buffers are two way set associative accumulation buffers.

3. A method for writing data from a pixel engine to system memory, comprising the steps of:
    a) providing write data from the pixel engine to a write data queue, wherein the write data includes pixel information interleaved with Z information;
    b) accumulating the write data from the write data queue into a first accumulation buffer, if the write data is pixel information;
    c) accumulating the write data from the write data queue into a second accumulation buffer, if the write data is Z information; and
    d) selecting one of the first and second accumulation buffers for writing to the system memory.

4. The method of claim 3 wherein step d) includes the step of selecting one of the first and second accumulation buffers based on a least recently used algorithm.

5. The method of claim 3 further comprising the steps:
    e) writing the selected buffer to a store buffer; and
    f) writing the store buffer to system memory.

6. The method of claim 5 further comprising the step of clearing the selected buffer.

7. A pixel engine pipeline comprising:
    a command queue coupled to provide graphics instructions from a graphics processor to a first stage of a pixel engine, the instructions including a read request for requested data;
    an attribute queue coupled to the command queue and a subsequent stage of the pixel engine, wherein the attribute queue stores an extraction instruction corresponding to at least a portion of the read request;
    a read request queue coupled to receive the read request from the command queue; p1 load request data queue;
    control logic, wherein the control logic stores a load request in the load request data queue if the requested data is not located in a data cache, the control logic generating data source instructions indicating a location of the requested data;
    a load data queue wherein the requested data is fetched from a system memory in accordance with the load request;
    a read data queue, wherein the control logic stores the requested data in the read data queue from one of the load data queue and the data cache in accordance with the data source instructions, wherein the subsequent stage extracts the requested data from the read data queue in accordance with the extraction instruction;
    a write data queue receiving write data from the pixel engine, wherein the write data includes pixel information interleaved with Z information;
    a first accumulation buffer, wherein pixel information from the write data queue is accumulated in the first accumulation buffer;
    a second accumulation buffer, wherein Z information from the write data queue is accumulated in the second accumulation buffer;
    a multiplexer for selecting a selected buffer from one of the first and second accumulation buffers; and
    a store buffer, wherein the selected buffer is written to the store buffer.

8. The pixel engine pipeline of claim 7, further comprising:

an intermediate queue coupled to store the data source instructions.

9. The pixel engine pipeline of claim 7 wherein each queue is a first-in-first-out queue such that the pixel engine pipeline is an in order pipeline.

10. A method of communicating data in a pixel engine pipeline, comprising the steps of:

a) storing a graphics instruction including a read request for requested data in a command queue;

b) storing an extraction instruction corresponding to at least a portion of the read request in an attribute queue;

c) storing the read request in a read request queue;

d) storing the read request in a load request data queue, if the requested data is not located in a data cache;

e) generating data source instructions indicating a location of the requested data;

f) fetching the requested data from a system memory into a load data queue in accordance with the load request, if the requested data is not in the data cache;

g) storing the requested data in a read data queue from one of the data cache and the load data queue in accordance with the data source instructions;

h) providing the requested data from the read data queue to a stage of the pixel engine in accordance with the extraction instructions in the attribute queue;

i) providing write data from the pixel engine to a write data queue, wherein the write data includes pixel information interleaved with Z information;

j) accumulating the write data from the write data queue into a first accumulation buffer, if the write data is pixel information;

k) accumulating the write data from the write data queue into a second accumulation buffer, if the write data is Z information; and l) selecting one of the first and second accumulation buffers for writing to the system memory.

11. The method of claim 10 wherein step g) further comprises the step of storing the requested data from the load data queue into the data cache.

12. The method of claim 11 wherein the requested data is stored in the read data queue from the load data queue before the requested data is stored in the data cache.

13. The method of claim 11 wherein the requested data is stored in the data cache from the load data queue before the requested data is stored in the read data queue.

* * * * *

UNITED STATES PATENT AND TRADEMARK OFFICE
CERTIFICATE OF CORRECTION

PATENT NO.    :   5,767,856
DATED         :   June 16, 1998
INVENTOR(S)   :   Peterson et al.

It is certified that error appears in the above-identified patent and that said Letters Patent is hereby corrected as shown below:

In column 6 at line 38 delete
    "from the command queue; p1 load request data queue;"
and insert
    --from the command queue;
  a load request data queue;--

Signed and Sealed this

Tenth Day of April, 2001

NICHOLAS P. GODICI

Attest:

*Attesting Officer*    *Acting Director of the United States Patent and Trademark Office*

UNITED STATES PATENT AND TRADEMARK OFFICE
CERTIFICATE OF CORRECTION

PATENT NO. : 5,767,856
DATED : June 16, 1998
INVENTOR(S) : James R. Peterson, Glenn C. Poole, Walter E. Donovan, and Paul A. Shupak It is certified that error appears in the above-identified patent and that said Letters Patent is hereby corrected as shown below:

<u>Column 6,</u>
Line 39, "command queue; p l load request data queue;" should read -- command queue; a load request data queue; --

Signed and Sealed this

Eighteenth Day of September, 2001

Attest:

Attesting Officer

NICHOLAS P. GODICI
Acting Director of the United States Patent and Trademark Office